(12) United States Patent
Claeys

(10) Patent No.: US 6,790,507 B1
(45) Date of Patent: Sep. 14, 2004

(54) STRENGTHENING LAYER FOR USE IN COMPOSITES TO BE FORMED BY MEANS OF VACUUM TECHNIQUE

(75) Inventor: Etienne Claeys, Waasmunster (BE)

(73) Assignee: Syncoglas S.A., Zele (BE)

( * ) Notice: Subject to any disclaimer, the term of this patent is extended or adjusted under 35 U.S.C. 154(b) by 0 days.

(21) Appl. No.: 10/069,866

(22) PCT Filed: Aug. 30, 2000

(86) PCT No.: PCT/EP00/08552

§ 371 (c)(1),
(2), (4) Date: Jul. 8, 2002

(87) PCT Pub. No.: WO01/15887

PCT Pub. Date: Mar. 8, 2001

(30) Foreign Application Priority Data

Aug. 30, 1999 (NL) .............................................. 1012935

(51) Int. Cl.[7] .................................................. B32B 7/00
(52) U.S. Cl. ....................... 428/119; 428/102; 428/107; 428/189; 428/359; 428/364
(58) Field of Search .................................. 428/102, 107, 428/119, 189, 359, 364, 123, 172, 175, 196; 264/511; 156/286, 104, 285; 427/296, 294

(56) References Cited

U.S. PATENT DOCUMENTS 4,942,013 A * 7/1990 Palmer et al. .............. 264/511

FOREIGN PATENT DOCUMENTS

| EP | 0 348 831 A2 | 1/1990 |
| JP | 11 058536 A | 3/1999 |

* cited by examiner

Primary Examiner—Merrick Dixon
(74) Attorney, Agent, or Firm—Christensen O'Connor Johnson Kindness PLLC

(57) ABSTRACT

The invention relates to a strengthening layer for composites to be formed by means of vacuum technique, which layer substantially consists of a strengthening material and for a smaller part of substantially round transport threads for guiding the resin therealong, which threads are substantially form-retaining in cross-section and lie substantially in the direction of the resin transport.

22 Claims, No Drawings

STRENGTHENING LAYER FOR USE IN COMPOSITES TO BE FORMED BY MEANS OF VACUUM TECHNIQUE

The present invention relates to a strengthening layer for composites to be formed by means of vacuum technique, as well as to an assembly of strengthening layers and composites containing the strengthening layer.

Vacuum techniques are used to make composites in a closed mould system. A vacuum is produced in the mould by means of a small opening on an outer end of the mould, while the resin is supplied at the other end via a small opening. The resin will fill the mould due to the underpressure in the mould.

Quite simple moulds are usually applied in such techniques. In some cases such moulds consist only of a lower mould with a cover foil. When a vacuum is produced in the mould there results an external pressure on the mould of about 1 bar. When the mould is partially flexible, such as when a cover foil is applied as upper mould, this pressure is also exerted on the strengthening layer present in mould. Since the mould as it were collapses and the strengthening layer is herein also compressed, the resin transport is in many cases made more difficult or even prevented.

Because the vacuum technique can be used with relatively low mould costs, it is an advantageous method. To nevertheless enable the use of this vacuum technique with these simple moulds use is currently made of so-called "bleeders". These are intermediate layers inserted between the strengthening layers so as to still allow resin transport. Such "bleeders" are for instance continuous glass mats, which cannot be compressed by the external pressure on the mould and its content. Such "bleeders" are however generally a disruptive element in the end product since they cause unnecessary thickness, weight, resin and material consumption. Furthermore, they leave behind a resin-rich location in the end product, thereby creating the danger of air inclusion.

The present invention therefore has for its object to provide a strengthening layer which is particularly suitable for forming composites by means of vacuum technique.

This is achieved with the invention by a strengthening layer which substantially consists of a strengthening material and for a smaller part of transport threads of substantially round and substantially form-retaining cross-section for guiding the resin therealong, which threads lie substantially in the direction of the resin transport. Because of the form-retaining nature of the transport threads they are not flattened by the external pressure but retain their form. It has been found that sufficient openings thereby remain along the threads to enable resin transport. The transporting speed of the resin can be influenced by the choice of the thread thickness and by the number of threads.

The transport threads can lie in the same plane as the rest of the strengthening material. In that case they preferably replace a part of this material, whereby no extra weight is added. The invention is however also effective when the transport threads are situated between the different layers of strengthening material.

Although the problem of the strengthening material being compressed can occur with different types of strengthening material, it is a particular problem in the case of strengthening material which takes at least partly the form of endless threads lying substantially parallel adjacently of each other, or multifilaments. Multifilaments are bundles of separate threads which are not mutually attached to each other within a bundle and are also not intertwined. They therefore spread into a flat surface in the case of external pressure.

The form-retention of the transport threads according to the invention can be achieved in different ways. It is thus possible to apply two or more twined single threads or a torsional single thread. In addition, form-retention can also be achieved by means of a substantially rigid coating applied to the whole or partial surface of the thread. Such a coating again ensures that the threads cannot be compressed. Although it is evident that a coating over the whole surface gives the best result, it is however also possible, in order to save material, to suffice with a coating in parts at intermediate distances such that sufficient rigidity is provided for the threads to prevent compression thereof under a pressure of about 1 bar. As coating can for instance be used a glue or other finishes known in the art of textile processing.

When the transport threads are monofilament threads, they already form one whole and for this reason cannot be flattened. A similar result can be achieved when the transport threads are provided with a sheath. Such a sheath can for instance be a knit or a braiding. The form-retention of the transport threads can likewise further be ensured in that they form part of a structure of threads which are mutually connected by a binding such that the round form of the transport threads cannot be distorted, or hardly so. Examples of such structures are for instance gauzes or webs manufactured according to Rachel technique.

Both the strengthening materials and the transport threads according to the invention can be formed from the usual strengthening materials applied for the reinforcement of plastics, such as glass, carbon, kevlar, flax, other vegetable or synthetic fibres or combinations thereof. The material applied for the transport threads can be the same as the rest of the strengthening material or different. Glass is mostly used as strengthening material and as material for the transport threads.

A strengthening layer according to the invention will in practice generally be applied in an assembly of a plurality of layers. Such an assembly comprises at, least one strengthening layer according to the invention and can in addition comprise for instance rovings and mats. It is however recommended to employ the transport threads distributed uniformly over the different strengthening layers, since the most homogenous possible resin distribution is then obtained.

The invention finally extends to composites which consist of at least one layer or assembly according to the invention embedded in resin.

By using one or more strengthening layers according to the invention in the manufacture of composites using the vacuum technique, a composite without intermediate layer (bleeder) can now be made with a great number of advantages. Firstly, a resin-rich layer is prevented from forming in the middle of the laminate. There is the danger of air inclusion taking place in such a layer. In addition, by choosing the same material for the transport threads as for the rest of the layer it is possible to prevent the end product containing laminate-foreign substances. Since the transport threads according to the invention preferably replace a part of the rest of the strengthening material, the composite will not need a greater thickness than is actually desirable. Since according to the invention no extra layer is needed and the threads are preferably used to replace a part of the strengthening material, no unnecessary consumption of resin is required. An additional bleeder, which has no function in the final laminate, moreover increases the weight of the laminate. This is also prevented by the transport threads according to the invention. Further prevented when the thickness is the same is that less strengthening can be inserted. Since a bleeder itself already has a relatively great thickness, less real material providing strengthening can be used. The bleeder is formed from criss-cross fibres which provide no or hardly any strengthening in one direction.

In this application "composite" is understood to mean a material in which the supporting function is taken over almost entirely by the reinforcement material (strengthening material). The resin herein has a sealing character and functions for the purpose of cohesion and stress transfer.

"Vacuum technique" is understood to mean the suction of resin by means of vacuum through a closed mould having therein one or more strengthening layers for the purpose of forming a composite.

A "strengthening layer" is a quantity of strengthening material displaying cohesion. The term "strengthening material" is used for the components of which a strengthening layer consists, such as multifilaments, glass rovings and so on.

The invention will be further elucidated with reference to the example following hereinbelow.

EXAMPLE

Comparison of Resin Transport in Different Types of Strengthening Material

1. Test Arrangement

The elongate strengthening layer for testing was placed between two sheets of foil functioning as mould. The foil sheets were sealed all round in order to enable creation of a vacuum in the mould. A vacuum was applied at the one end of the mould, while resin was fed into the mould at the other end. A measuring rule was positioned in longitudinal direction of the mould to enable determining of the distance covered by the resin per unit of time.

2. Strengthening Materials As first comparison material an assembly of strengthening layers was manufactured from six layers of unidirectional webs, wherein in longitudinal direction each layer had a weight of 1125 $g/m^2$ glass rovings and in transverse direction a weight of 75 $g/m^2$ glass rovings. A glass mat of 50 $g/m^2$ was attached hereto. Such an assembly cannot be formed without any problem into a composite by means of vacuum techniques. A continuous glass mat of 450 g was therefore placed as "bleeder" between the third and fourth layer of unidirectional webs. The thickness of this continuous mat was roughly 0.8 mm. The thickness of each layer of unidirectional web was 0.9 mm.

As second comparison material the above described assembly of strengthening layers was used without the bleeder.

In the material according to the invention 20 $g/m^2$ glass roving in the above mentioned web of 1250 $g/m^2$ was replaced by twined glass yarn in the direction in which the resin transport has to be directed. The web is not changed appreciably by this replacement.

3. Result

By means of the comparison material with the stated (continuous mat) bleeder the resin can be transported over about 35 cm in 15 minutes with the vacuum technique. Without the continuous glass mat as bleeder the transport is found to amount to only 10 cm in 15 minutes. The resin transport in the material according to the invention amounts to 35 cm in 15 minutes.

It can be seen from the foregoing that with much less material and in simple manner an at least equally good result can be obtained according to the invention as when a bleeder is applied.

What is claimed is:

1. A strengthening layer for composites comprising a resin to be formed by means of a vacuum technique, comprising:

a strengthening material; and a plurality of transport threads of substantially round and substantially form-retaining cross-section for guiding the resin therealong wherein said threads lie substantially in the direction of the resin transport.

2. The strengthening layer as claimed in claim 1 wherein the transport threads lie in the same plane as the rest of the strengthening material.

3. The strengthening layer as claimed in claim 1 wherein the transport threads lie against one or both sides of the strengthening layer.

4. The strengthening layer as claimed in claim 1 wherein the strengthening material takes at least partly the form of endless threads lying substantially parallel adjacently of each other.

5. The strengthening layer as claimed in claim 1 wherein the form-retention of the transport threads is achieved in that said threads comprise at least two twined single threads.

6. The strengthening layer as claimed in claim 1 wherein the form-retention of the transport threads is achieved in that said threads comprise torsional single threads.

7. The strengthening layer as claimed in claim 1 wherein the form-retention of the transport threads is achieved in that said threads further comprise a coating applied to at least a partial surface of the thread.

8. The strengthening layer as claimed in claim 7 wherein the coating is a glue.

9. The strengthening layer as claimed in claim 1 wherein the form-retention of the transport threads is achieved in that said threads are monofilament threads.

10. The strengthening layer as claimed in claim 1 wherein the form-retention of the transport threads is achieved in that said threads are provided with a sheath.

11. The strengthening layer as claimed in claim 10 wherein the sheath comprises a knit.

12. The strengthening layer as claimed in claim 10 wherein the sheath comprises a braiding.

13. The strengthening layer as claimed in claim 1 wherein the form-retention of the transport threads is achieved in that said threads form part of a structure of threads which are mutually connected by a binding such that the round form of the transport threads is substantially form-retaining during the vacuum technique.

14. The strengthening layer as claimed in claim 13 wherein the form-retention of the transport threads is achieved in that said threads form part of a gauze.

15. The strengthening layer as claimed in claim 13 wherein the form-retention of the transport threads is achieved in that said threads form part of a web manufactured according to the Rachel technique.

16. The strengthening layer as claimed in claim 1 wherein the transport threads are formed from at least one of glass, carbon, kevlar, flax, other vegetable, synthetic fibres and combinations thereof.

17. The strengthening layer as claimed in claim 1 wherein the strengthening material is formed from at least one of glass, kevlar, flax, other vegetable, synthetic fibres and combinations thereof.

18. The strengthening layer as claimed in claim 1 wherein the transport threads are manufactured from at least one of the same materials as the strengthening material.

19. The strengthening layer as claimed in claim 1 wherein said layer is embedded in resin.

20. The strengthening layer as claimed in claim 4 wherein the strengthening material at least partly takes the form of multifilaments.

21. The strengthening layer as claimed in claim 4 wherein the transport threads lie in the same plane as the rest of the strengthening material.

22. The strengthening layer as claimed in claim 4 wherein the transport threads lie against one or both sides of the strengthening layer.

* * * * *